United States Patent
Byrum et al.

(10) Patent No.: US 9,917,828 B2
(45) Date of Patent: *Mar. 13, 2018

(54) SECURE MESSAGE DELIVERY USING A TRUST BROKER

(71) Applicant: MICROSOFT TECHNOLOGY LICENSING, LLC, Redmond, WA (US)

(72) Inventors: Frank Byrum, Seattle, WA (US); Mayank Mehta, Redmond, WA (US); Chandresh Jain, Sammamish, WA (US); Ladislau Conceicao, Redmond, WA (US); Brian Kress, Woodinville, WA (US); Greg Gourevitch, Redmond, WA (US); Michael Nelte, Redmond, WA (US); Chris Barnes, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/271,304

(22) Filed: May 6, 2014

(65) Prior Publication Data

US 2014/0245000 A1   Aug. 28, 2014

Related U.S. Application Data

(63) Continuation of application No. 12/143,856, filed on Jun. 23, 2008, now Pat. No. 8,732,452.

(51) Int. Cl.
*H04L 29/06* (2006.01)
*H04L 12/58* (2006.01)

(52) U.S. Cl.
CPC .......... *H04L 63/0807* (2013.01); *H04L 51/00* (2013.01); *H04L 63/0428* (2013.01); *H04L 63/0435* (2013.01)

(58) Field of Classification Search
CPC .................................................. H04L 63/0807
See application file for complete search history.

(56) References Cited

U.S. PATENT DOCUMENTS 6,370,249 B1   4/2002   Van Oorschot
7,346,923 B2   3/2008   Atkins et al.
(Continued)

OTHER PUBLICATIONS

Postini, "Postini Announces Availability of Postini Encryption Manager as Part of Groundbreaking Federated Encryption Strategy", Date: Feb. 13, 2006, retrieved from <<http://www.postini.com/news_events/pr/pr021306.php>> on Apr. 18, 2008, 2 pages.
(Continued)

*Primary Examiner* — Oleg Korsak
*Assistant Examiner* — Simon Kanaan
(74) *Attorney, Agent, or Firm* — Christopher J. Volkman; Kelly, Holt & Christenson, PLLC

(57) ABSTRACT

An email security system is described that allows users within different organizations to securely send email to one another. The email security system provides a federation server on the Internet or other unsecured network accessible by each of the organizations. Each organization provides identity information to the federation server. When a sender in one organization sends a message to a recipient in another organization, the federation server provides the sender's email server with a secure token for encrypting the message to provide secure delivery over the unsecured network.

20 Claims, 5 Drawing Sheets

(56) References Cited

U.S. PATENT DOCUMENTS

| | | | |
|---|---|---|---|
| 8,340,283 B2* | 12/2012 | Nadalin | H04L 63/02 380/28 |
| 8,495,380 B2* | 7/2013 | Fu | H04L 63/061 380/277 |
| 9,560,519 B1* | 1/2017 | McCracken, Jr. | H04W 8/18 |
| 2004/0139314 A1* | 7/2004 | Cook | G06Q 10/107 713/151 |
| 2005/0076221 A1 | 4/2005 | Olkin et al. | |
| 2005/0223412 A1 | 10/2005 | Nadalin et al. | |
| 2006/0136990 A1* | 6/2006 | Hinton | H04L 67/30 726/2 |
| 2006/0206931 A1* | 9/2006 | Dillaway | G06F 21/6218 726/9 |
| 2006/0212520 A1 | 9/2006 | Logue et al. | |
| 2006/0242244 A1 | 10/2006 | Logue et al. | |
| 2007/0055867 A1 | 3/2007 | Kanungo et al. | |
| 2007/0136801 A1 | 6/2007 | Le et al. | |
| 2007/0143829 A1 | 6/2007 | Hinton et al. | |
| 2007/0269041 A1 | 11/2007 | Bhatnagar et al. | |
| 2008/0010665 A1 | 1/2008 | Hinton et al. | |
| 2009/0064284 A1* | 3/2009 | Poston | G06F 21/6218 726/4 |

OTHER PUBLICATIONS

Lux, Kevin, "WSEmail Applications", Date: Aug. 2005, 9 Pages.

Javvin Technologies, Inc., "MIME and SMIME: Multipurpose Internet Mail Extensions and Secure MIME", retrieved from <<http://www.javvin.com/protocolMIME.html>> on Apr. 18, 2008, 3 pages.

Office Action from the United States Patent and Trademark Office regarding U.S. Appl. No. 12/143,856, dated Aug. 6, 2012, 9 pages.

Office Action from the United States Patent and Trademark Office regarding U.S. Appl. No. 12/143,856, dated Jun. 20, 2013, 11 pages.

Notice of Allowance from the United States Patent and Trademark Office regarding U.S. Appl. No. 12/143,856, dated Dec. 31, 2013, 8 pages.

* cited by examiner

SECURE MESSAGE DELIVERY USING A TRUST BROKER

CROSS-REFERENCE TO RELATED APPLICATIONS

This application is a continuation of and claims priority to U.S. patent application Ser. No. 12/143,856 titled SECURE MESSAGE DELIVERY USING A TRUST BROKER, which was filed on Jun. 23, 2008 and issued as U.S. Pat. No. 8,732,452 on May 20, 2014 and which is incorporated by reference in its entirety.

BACKGROUND

E-mail, short for electronic mail and often abbreviated to e-mail, email or simply mail, is a store-and-forward method of composing, sending, receiving, and storing messages over electronic communication systems. The term "e-mail" (as a noun or verb) applies to several different types of systems, including the Internet e-mail system based on the Simple Mail Transfer Protocol (SMTP), X.400 systems, and to intranet systems allowing users within an organization to e-mail each other. Intranets may use Internet protocols or X.400 protocols for internal e-mail service. Messages are exchanged between hosts using SMTP with software programs called mail transport agents (MTAs). Users can download their messages from servers with standard protocols such as the Post Office Protocol (POP) or Internet Message Access Protocol (IMAP), or, as is more likely in a large corporate environment, with a proprietary protocol specific to Lotus Notes or Microsoft Exchange Servers (e.g., Messaging Application Programming Interface (MAPI)/Remote Procedure Call (RPC)).

FIG. 1 is a block diagram that illustrates a typical sequence of events when a user sends an email message over the Internet. In block 110, a user Alice types in, or selects from an address book, the e-mail address of her recipient, types a message, and hits the "send" button using her mail user agent (MUA). Alice's MUA formats the message in Internet e-mail format and uses SMTP to send the message to the local MTA, in this case smtp.a.org, run by Alice's Internet Service Provider (ISP). The MTA reads the destination address provided by SMTP, in this case bob@b.org, and, in block 120, looks up the associated domain name in the Domain Name System (DNS) to find the mail exchange servers accepting messages for that domain. In block 130, the DNS server for the b.org domain, ns.b.org, responds with a mail exchange (MX) record listing the MX servers for that domain, in this case mx.b.org, a server run by the recipient's ISP. In block 140, Alice's MTA, smtp.a.org, sends the message to mx.b.org using SMTP, which delivers it to the mailbox of the user Bob. In block 150, Bob presses the "get mail" button in his MUA, which picks up the message using POP or another suitable protocol.

One problem with email is that it is not very secure. As illustrated by FIG. 1, SMTP is a text-based protocol and messages using SMTP traverse the Internet, going through any number of servers, routers, and domains. Along any of these routes, the message can be easily intercepted and modified. Even if the message is not modified, an undesirable person may be able to view the message's contents, making email unsuitable for confidential business or personal information. Another problem is that email can be easily spoofed, or made to appear to come from someone other than the real sender. Spammers often used the text-based nature of SMTP to fill in whatever sender information is most likely to cause an unsuspecting recipient to read the message.

Many government, corporate, and organizational environments that depend on secure email have elected to operate private email servers that do not transmit email addressed to recipients within the organization over the Internet. Instead, these email servers transmit email over a secure corporate network, using either a local area network (LAN) or a virtual private network (VPN) in combination with LANs to create a secure channel to connect remote offices of the same organization. However, this does not help when members of these organizations need to send email to a member of another organization (e.g., when a Microsoft employee sends email to an Intel employee).

Other solutions require an initial exchange of certificates or keys between users that is difficult between large organizations. For example, two users can securely send email to one another by exchanging keys and using S/MIME (Secure/Multipurpose Internet Mail Extensions) or Pretty Good Privacy (PGP). Large organizations can encrypt the delivery of messages between them by exchanging certificates and using the Secure Sockets Layer (SSL) or other secure protocol (e.g., IPSEC) to transmit the email back and forth. It is not feasible for each organization to securely convey (e.g., hand carry) a storage medium full of keys to every other organization with which its members may want to securely exchange email. This type of solution does not scale well as the number of organizations increases, and does not allow communication between parties that have not previously met.

SUMMARY

An email security system is described that allows users within different organizations to securely send email to one another. The email security system provides a federation server on the Internet or other unsecured network accessible by each of the organizations. Each organization provides identity information to the federation server. Email servers within each organization also have access to the organization's identity information (e.g., a public key). The email security system receives a new email message from a sender's client computer at the organization's internal email server. The system identifies the domain of the message recipient and sends a request from the sender's email server to the federation server to request a token for securely communicating with the recipient's email server. The recipient's organization has typically previously provided identity information to the federation server. The federation server verifies the sending email server's identity and sends the requested token for securely sending email to the recipient's email server. The email security system encrypts the email message at the sending email server using the received token and sends the encrypted email message to the recipient's email server. The recipient's email server receives the email message, decrypts the message using the recipient organization's identity information (e.g., a private key), and delivers the email message to the recipient's inbox. Thus, the email security system allows users belonging to two different organizations to send email securely.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
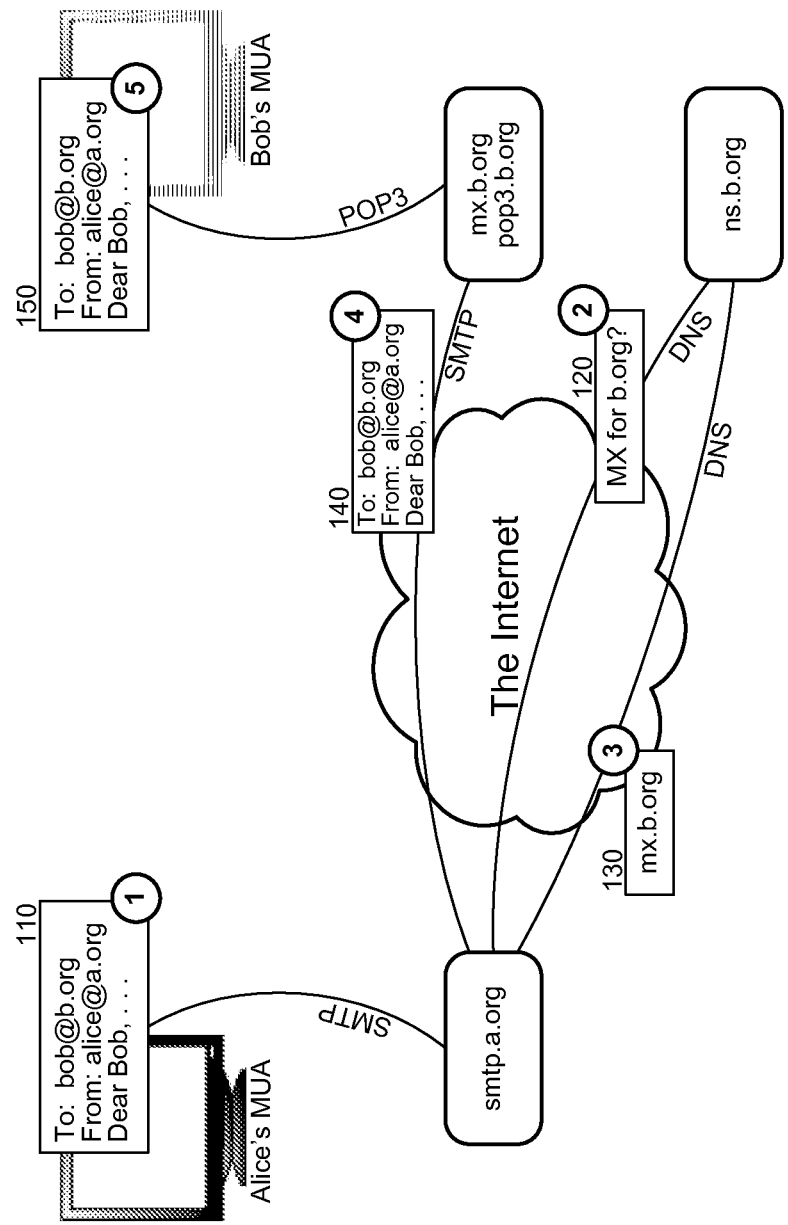
FIG. 1 is a block diagram that illustrates a typical sequence of events when a user sends an email message over the Internet.

An email security system is described that allows users within organizations that belong to a federation to securely send email to one another. The email security system provides a federation server on the Internet or other unsecured network accessible by each of the organizations. The federation server may be composed of many actual servers, some hosted on the Internet and others hosted on premises at the organization, and may also be operated by a third-party unrelated to the organization. Each organization provides identity information (e.g., a certificate, public keys, shared secrets, and so on) to the federation server. Email servers within each organization also have access to the organization's identity information (including private keys, which are typically only accessible by the organization's email servers). For example, an administrator may set up each of the email servers with the identity information and provide the information to the federation server by mail, in person, or by another secure method (e.g., programmatically using web services). The email security system receives a new email message from a sender's client computer at the organization's internal email server. For example, a user using an email client application, such as Microsoft Outlook, may compose and send a message. The email security system identifies the domain or host of the message recipient by inspecting the message header (e.g., using SMTP) or properties (e.g., using MAPI). The system sends a request from the sender's email server to the federation server that (1) identifies the sender's email server as a part of the organization using the organization's identity information and (2) requests a token for securely communicating with the recipient's email server.

The email security system, via the federation server, verifies the sender email server's identity by comparing the received identity information with the previously provided identity information. If the information matches and the recipient's server has federated, then the federation server sends the requested token for securely sending email to the recipient's email server. This token can typically only be opened by the recipient organization's email servers, which have the recipient organization's private key. Along with the token, the federation server may also provide a key with which the sending server can encrypt the message. This key is also present in the encrypted token meant for the receiving server, so that the receiving server can retrieve the key and decrypt the message. The email security system encrypts the email message at the sender's email server using information sent with the received token and sends the encrypted email message to the recipient's email server. The email security system receives the email message at the recipient's email server, decrypts the message using the recipient organization's identity information. If there are no problems decrypting the message (i.e., it was encrypted with the expected key in the token), then the email security system delivers the email message to the recipient's inbox for retrieval by the recipient. Thus, the email security system allows users belonging to two different organizations to send email securely.

In some embodiments, the recipient's email server also verifies the identity of the sender's email server. When the federation server provides the token, the token may include a verification of the sender's identity signed by the federation server, so that the recipient's email server can know that the federation server verified the identity of the sender's email server. When the recipient's email server receives the encrypted message and decrypts the message, the recipient's email server also receives the verification of the sender's identity. In this way, the recipient's email server knows that not only was the email not tampered with after if left the sender's email server, but also that the sender's email server was not malicious by claiming the message came from some other organization.

The email security system provides numerous advantages. Each organization only has to provide its security information (e.g., certificates, tokens, public keys) to a single federation server or organization (that acts as a trust broker between the organizations), and then can securely exchange email with any other organization that has also provided its security information to the federation server. Users do not have to be aware that anything different has taken place, they simply send and receive messages as they always have, and behind the scenes their organization's email server allows them to securely exchange email with recipients at other organizations. Unlike user-to-user encryption methods, the email message does not need to be encrypted using a different key for each recipient, but rather only a different key for each organization. Thus, for a message addressed to multiple recipients at the same organization, the email security system can encrypt and send the message one time to all of the recipients rather than once to each recipient. The encryption provided by the email security system is secure regardless of how many hops or routes the message takes between the sender's email server and the recipient's email server. These and other advantages are described in further detail herein.

Figure 2:
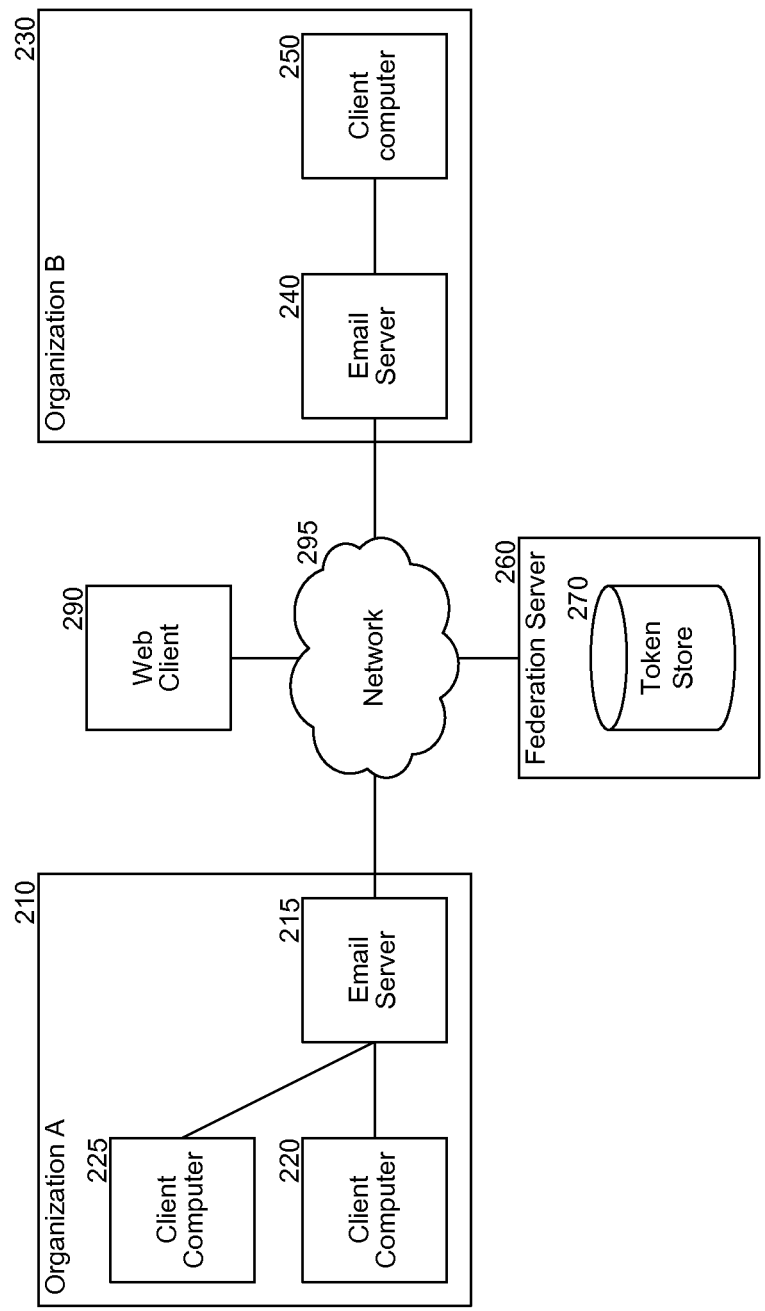
FIG. 2 is a block diagram that illustrates components and a typical operating environment of an email security system, in one embodiment.

FIG. 2 is a block diagram that illustrates the components and typical operating environment of the email security system, in one embodiment. A first organization 210 contains one or more email servers 215 and one or more client computers 220 and 225. The email server 215 receives email messages to send from users of client computers 220 and 225 and provides an inbox for each user to receive email. The email server 215 and client computers 220 and 225 are typically connected over a secure network, such as a LAN. A second organization 230 similar to the first organization 210 contains one or more email servers 240 and one or more client computers 250 that communicate over an internal network. The first organization 210 and second organization 230 are connected together through an unsecured network 295, such as the Internet. The unsecured network 295 is connected to many other organizations, computers, routers, and so forth. A web client 290 is shown through which users can remotely connect to an organization, such as the first organization 210 over the unsecured network 295. The web client 290 typically connects to an organization using a separate security device, such as a smart card or hardware token associated with the user.

A federation server 260 or trust broker is also shown that provides tokens for securing email in the manner described herein. The federation server 260 contains a token store 270 that stores information provided by each organization, such as public keys, certificates for verifying the identity of requests from the organization, and so on. The federation server 260 makes it possible for each organization to trust each other by each delegating trust to the trust broker. Although single servers are shown in FIG. 2, such as for the federation server 260 or email server 215, those of ordinary skill in the art will recognize that few services are provided by a single server, and are more often provided by a cluster of servers for failover, redundancy, and improved availability. Thus, although a single server is often described herein for ease of description, the server could represent a cluster of servers or other load balancing arrangement using well-known techniques in the art.

The computing devices on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In some embodiments, the token provided to a sender's email server by the federation server is a Security Assertion Markup Language (SAML) token. SAML is an eXtensible Markup Language (XML) standard for exchanging authentication and authorization data between security domains, that is, between an identity provider (a producer of assertions) and a service provider (a consumer of assertions). SAML assumes the principal (in this case each organization) has enrolled with at least one identity provider (the federation server). This identity provider is expected to provide local authentication services to the principal. However, SAML does not specify the implementation of these local services; indeed, SAML is not concerned with how local authentication services are implemented. Thus, a service provider relies on the identity provider to identify the principal. At the principal's request, the identity provider passes a SAML assertion to the service provider. Based on this assertion, the service provider makes an access control decision.

In some embodiments, the SAML assertions provided by the email security system contain a proof of possession key. The proof of possession key is a symmetric cryptographic key (e.g., a 128-bit symmetric key) that the sender's email server uses to encrypt the message. The proof of possession key is typically a symmetric key (e.g., 128 or 192 bytes in length or more). The proof of possession key is used to encrypt the message and is also present in the token that is encrypted with the recipient's organization public key, which means that the token can only be opened by the recipient organization (which holds the private key). Once the recipient organization opens the token, it extracts this key and decrypts the message. The recipient organization may also verify a signature of the sender of the message. If the message can be decrypted successfully and the signature of the sender can be verified, then the recipient organization knows that the message was not tampered with en route.

In some embodiments, the token provides a claim of the purpose of the token. For example, the token may indicate that a federation server provided it for the purpose of secure email. This can be useful for federation servers that distribute tokens for many different purposes, such as Microsoft's Live ID (formerly Passport). If an organization uses the same key for access to multiple services, it is helpful to know that an organization did not obtain a token for one purpose and use it for another. It is possible that the sending organization is granted access to use secure email, but not other services provided by the recipient organization. Thus, verifying the purpose claim allows the recipient organization to know that the token is being used only for its intended purpose.

In some embodiments, the security information that the email security system adds to a message is sent with the message as a Multipurpose Internet Mail Extensions (MIME) part. MIME allows messages sent using SMTP or other protocols to contain multiple parts for different purposes. For example, a message can be sent in both text and HyperText Markup Language (HTML) format, or can contain extra security data. Email clients can remove parts that they do not understand and provide the recipient with the parts that the email client does understand. Alternatively, the email security system may provide the security information using the Cryptographic Message Syntax (CMS), a standard for cryptographic protected messages that can be used to digitally sign, digest, authenticate, or encrypt any form of digital data.

In some embodiments, the email security system is used to exchange email messages between servers in the same organization. As discussed in the background, it is common to use a VPN to connect email servers of an organization at different sites. Using the email security system described herein, organizations can provide secure email delivery between remote sites of the same organization over the Internet without having to create a secure channel between each site. Although many organizations have offices at different sites, another usage of this scenario is for testing of new versions of an email server. For example, Microsoft can provide a testing lab for organizations to move a sampling of users (e.g., 500) over to a new version of Microsoft Exchange that is hosted at the testing lab. The organization would likely want to know that email exchanged between the organization's servers and Microsoft's test servers is secure. Thus, the email security system enables these and other useful scenarios.

In some embodiments, the sending email server adds control information to the email message before sending it to the recipient email server. For example, the sending email server may add control information that indicates that the email message has been virus scanned, run through a SPAM filter, and so on. Depending on the level of trust between the two organizations, the recipient organization may rely on the sending organization for performing any actions that the control information indicates, and not repeat those actions at the recipient server. For example, the recipient server may decide not to virus scan messages that a sending server indicates has already been virus scanned, much as if the two servers were part of the same organization.

Figure 3:
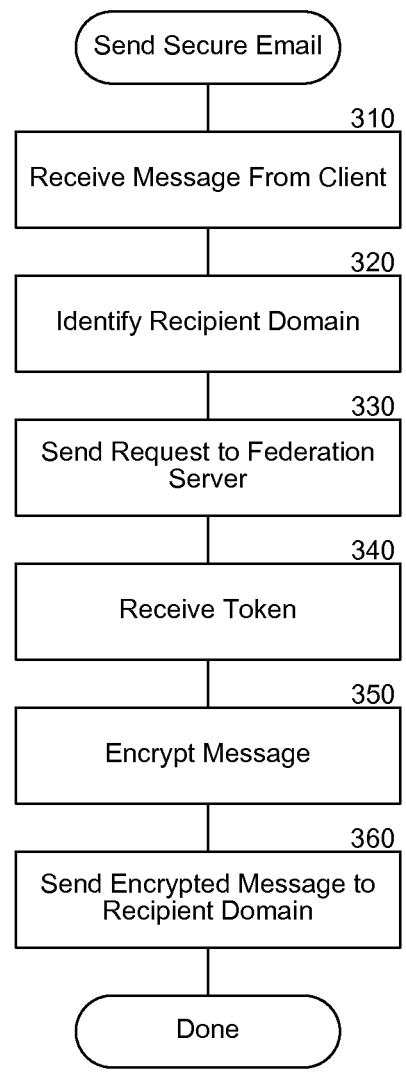
FIG. 3 is a flow diagram that illustrates the processing of a sender's email server to send secure email using the email security system, in one embodiment.
Figure 4:
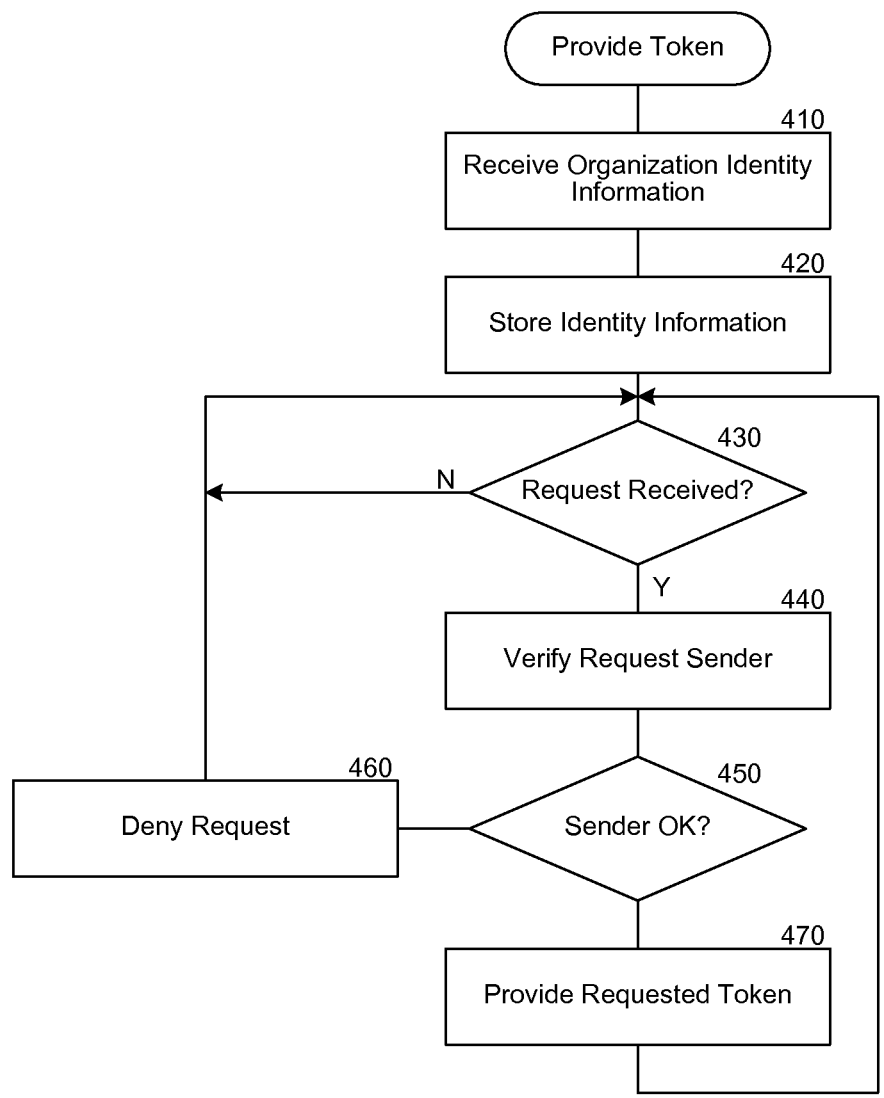
FIG. 4 is a flow diagram that illustrates the processing of a federation server of the email security system, in one embodiment.
Figure 5:
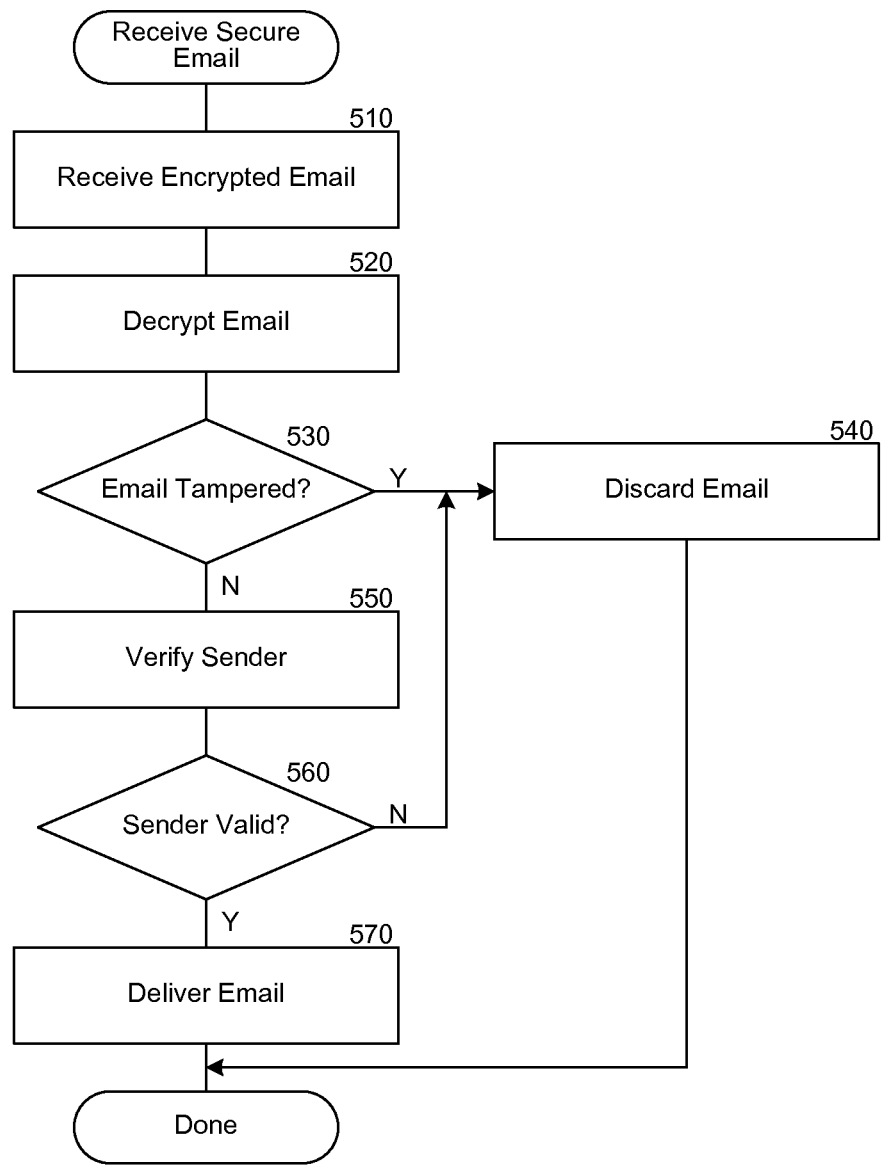
FIG. 5 is a flow diagram that illustrates the processing of a recipient's email server to receive secure email using the email security system, in one embodiment.

FIGS. 3-5 are flow diagrams that illustrate the processes described herein from the perspective of the sender's email server, federation server, and recipient's email server respectively. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 3 is a flow diagram that illustrates the processing of the sender's email server to send secure email using the email security system, in one embodiment. In block 310, the server receives a message from an email client within the organization. For example, a user of a client computer may send a message using Microsoft Outlook or another email client application. In block 320, the server identifies the domain of the recipient. For example, if the message uses SMTP, then the server receives one or more RCPT TO commands from the client that identify the message recipient. As another example, if the message uses MAPI, then the server accesses the message property containing the list of recipients. If the message has recipients at multiple domains, then the server repeats the following steps for each of the domains. In block 330, the sender's email server sends a request to the federation server to get a token for securely sending email to the recipient's email server. The request includes identity information for verifying the identity of the sender's email server to the federation server, and optionally a purpose for which the token is requested (e.g., secure email).

In block 340, the sender's email server receives the requested token and associated information. For example, the token may contain claims related to the security request, the proof of possession key, the sender's identity, and so forth encrypted using the public key of the recipient's organization. The proof of possession key is also sent in the unencrypted part of the token, so that the sending organization can use it to encrypt the message. In block 350, the sender's email server adds security information to the message and encrypts the message. For example, the security information may be added as extra MIME parts to the message and may include information such as control flags related to processing performed on the message. In some embodiments, the sender's email server creates a separate content encryption key and uses that key to encrypt the message. Then, the sender's email server encrypts the content encryption key with the proof of possession key and includes the encrypted content encryption key with the message. The receiver is able to get the proof of possession key from the token using the receiving organization's private key, and can decrypt the content encryption key using the proof of possession key. The email security system may encrypt and decrypt messages using any suitable cryptographic encryption algorithm, many of which are well known in the art. In block 360, the sender's email server sends the encrypted message to the recipient's domain, typically over an unsecure network. After block 360, these steps conclude.

FIG. 4 is a flow diagram that illustrates the processing of the federation server of the email security system, in one embodiment. In block 410, the server receives organization identity information for one or more organizations that want to use the services of the federation server as a trust broker with other organizations. In block 420, the federation server stores the identity information for later use. For example, the federation server may use a database to store information about each organization. Block 430 begins the main loop in which the federation server typically operates. In decision block 430, if the federation server has not received a token request, then the server loops to block 430, else the server continues at block 440. In block 440, having received a request the federation server verifies the request sender based on the organization that the request sender claims to be from, identity information provided in the request, and the previously stored identity information received from the organization. For example, the request may provide information signed with the private key of the organization that the federation server verifies using the public key of the organization stored in the identity information.

In decision block 450, if the sender is invalid, then the server continues at block 460, else the server continues at block 470. For example, the request may have been an attempt to appear as another sender (e.g., spoofing) to send SPAM to an organization. In block 460, the server denies the request and loops to block 430 to wait for the next request. The server may send a denial message or may simply discard the request and not respond at all. Prior to block 470, the server may optionally determine whether the recipient organization is participating in federation. If not, then the server may send a response to the sender's request indicating that a token for the recipient organization is not available. In block 470, the server retrieves the domain with which the request sender wants to communicate from the request and provides an appropriate token to the validated sender. The token may include the purpose of the token, the domain for which the token can be used, one or more keys, additional claims about the requestor or domain, and so forth. Using the token the sender can securely send email to the desired organization.

FIG. 5 is a flow diagram that illustrates the processing of the recipient's email server to receive secure email using the email security system, in one embodiment. In block 510, the recipient server receives an encrypted email message. For example, the recipient server may listen for messages through a connection to the Internet. In block 520, the recipient server attempts to decrypt the email message using a private key of the organization. As noted above in reference to FIG. 3, the message may be encrypted using a content encryption key that is itself encrypted and sent along with the message. The recipient's email server can use its private key to decrypt the proof of possession key in the token, and the proof of possession key to decrypt the content encryption key which is then used to decrypt the message. In decision block 530, if the decryption indicates that the email has been tampered with, then the server continues at block 540, else the server continues at block 550. In block 540, the server discards the email message. The server may send a rejection message to the email sender to help with diagnosing potential problems or may not to prevent denial of service attacks. The server also extracts additional information from the decrypted message that may have been added by the sending email server. For example, the message may contain a signature that authenticates the sending email server, one or more control flags, and other information. In block 550, the server verifies the message sender using information in the decrypted message. For example, if the message contains a sending server signature or proof of the sender's identity signed by the federation server, then the recipient server determines whether the signature is valid using the appropriate public key. In decision block 560, if the sender is invalid, then the server continues at block 540, else the server continues at block 570. In block 570, the server delivers the decrypted email message to the recipient's inbox. The recipient will later connect to the server with an email client and retrieve the message. The server may also process any control options sent with the message to determine whether the server should, for example, scan the message for viruses, check the message against a SPAM filter, and so forth.

In some embodiments, the email security system allows organizations to federate with particular other organizations. For example, an administrator may provide a list of organizations with which federated message delivery is desirable. When a sender sends a message to a recipient at an organization configured for federated delivery by the administrator, the email server sends the message using the process described herein. For other organizations, the email server may use traditional delivery methods.

From the foregoing, it will be appreciated that specific embodiments of the email security system have been described herein for purposes of illustration, but that various modifications may be made without deviating from the spirit and scope of the invention. For example, although the system is described primarily in the context of email, similar techniques could be applied to extend security to other forms of data exchange, such as instant messaging, application sharing, and so forth. As another example, although corporate email servers are used as examples, the system can also be used for general Internet email. ISPs (e.g., Comcast, EarthLink), Internet email providers (e.g., Microsoft Live Mail, Google Gmail), and any other types of email servers can use the techniques described herein to provide secure email exchange with other providers and organizations. Accordingly, the invention is not limited except as by the appended claims.

We claim:

1. A computer-implemented method comprising:
    storing, in a data store associated with a federation server, first identity information associated with a first server and second identity information associated with a second server, wherein:
        the first server is configured to provide a computing service to a first user,
        the second server is configured to provide a computing service to a second user,
        the federation server is configured to communicate with, and act as a trust broker between, the first server and the second server,
        the first identity information includes a first public key associated with the first server, and
        the second identity information includes a second public key associated with the second server;
    receiving, by the federation server, a request from the first server for a token for securely sending a message from the first server to the second server over an unsecured communication network between the first server and the second server; and
    in response to the request from the first server:
        identifying, by the federation server, a first private key from the request;
        verifying, by the federation server, identity of the first server using the first private key and the first public key;
        based on verifying the identity of the first server, generating, by the federation server, an encrypted token that is encrypted with the second public key and includes a symmetric key; and
        sending, by the federation server to the first server, a response to the request, wherein the response includes the encrypted token that is decryptable by the second server using a second private key that is stored in association with the second server and corresponds to the second public key.

2. The computer-implemented method of claim 1, wherein the first server is associated with a first organization, and the second server is associated with a second organization.

3. The computer-implemented method of claim 1, wherein:
    the first server is configured to secure the message by encrypting the message with a separate encryption key and encrypting the separate encryption key with the symmetric key, and
    the second server is configured to obtain the symmetric key from the encrypted token, decrypt the separate encryption key using the symmetric key, and decrypt the message using the separate encryption key.

4. The computer-implemented method of claim 1, further comprising:
    receiving, by the federation server from the first server, a request for each domain of a plurality of different domains identified in the message, wherein the message is addressed to multiple recipients at the different domains.

5. The computer-implemented method of claim 1, wherein the encrypted token can only be opened by the second server using the second private key.

6. The computer-implemented method of claim 1, wherein the request includes information identifying a purpose for which the token is requested.

7. The computer-implemented method of claim 1, wherein the first server is configured to secure the message by encrypting the message with the symmetric key, and the second server is configured to obtain the symmetric key from the encrypted token and decrypt the message using the symmetric key.

8. A computing system comprising:
    at least one processor; and
    memory storing instructions that, when executed by the at least one processor, configure the computing system to:
        store, in a data store associated with a federation server, first identity information associated with a first server and second identity information associated with a second server, wherein:
            the first server is configured to provide a computing service to a first user,
            the second server is configured to provide a computing service to a second user, the federation server is configured to communicate with and, act as a trust broker between, the first server and the second server, the first identity information includes a first public key associated with the first server, and the second identity information includes a second public key associated with the second server;

receive, by the federation server, a request from the first server for a token for securely sending a message from the first server to the second server over an unsecured communication network between the first server and the second server; and in response to the request from the first server:
identify, by the federation server, a first private key from the request, verify, by the federation server, identity of the first server as a sender of the message using the first private key and the first public key, based on verifying identity of the first server, generate, by the federation server, an encrypted token that is encrypted with the second public key and includes a symmetric key that encrypts the message; and send, by the federation server to the first server, a response to the request, wherein the response includes the encrypted token that is decryptable using a second private key that is stored in association with the second server and corresponds to the second public key.

9. The computing system of claim 8, wherein
the second server is configured to:
receive the message having the encrypted token;
access the symmetric key using the second private key corresponding to the second public key encrypted in the encrypted token; and
based on accessing the symmetric key, decrypt the message using the symmetric key.

10. The computing system of claim 8, wherein:
the first server is configured to secure the message by encrypting the message with a separate encryption key and encrypting the separate encryption key with the symmetric key, and
the second server is configured to obtain the symmetric key from the encrypted token, decrypt the separate encryption key using the symmetric key, and decrypt the message using the separate encryption key.

11. The computing system of claim 8, wherein the instructions configure the computing system to:
receive, by the federation server, a request for each domain, of a plurality of different domains identified in the message, when the message is addressed to multiple recipients at the different domains.

12. The computing system of claim 8, wherein the instructions configure the computing system to:
determine, by the second server, that the verification of the first server as a sender of the message is valid based on the second private key of the second server.

13. The computing system of claim 8, wherein the instructions configure the computing system to:
identify, by the federation server and based on the request, a purpose for which the token is requested.

14. The computing system of claim 8, wherein the first server is associated with a first organization, and the second server is associated with a second organization.

15. A federation server comprising:
at least one processor; and
memory storing instructions executable by the at least one processor, wherein the instructions, when executed, configure the federation server to:
store first identity information associated with a first server and second identity information associated with a second server, wherein:
the first server is configured to provide a computing service to a first user,
the second server is configured to provide a computing, service to a second user,
the federation server is configured to communicate with and, act as a trust broker between, the first server and the second server,
the first identity information includes a first public key associated with the first server; and
the second identity information includes a second public key associated with the second server;
receive a request from the first server for a token for securely sending a message from the first server to the second server over an unsecured communication network between the first server and the second server; and
based on the request,
identify a first private key;
based on a determination that the first private key corresponds to the first public key associated with the first server, verify identity of the first server as a sender, of the request;
based on the first server being verified as the sender of the request, generate an encrypted token that is encrypted with the second public key and a symmetric key;
send a response to the request to the first server, wherein:
the response includes the encrypted token containing the second public key and the symmetric key, and
the encrypted token is decryptable using a second private key that is stored in association with the second server and corresponds to the second public key.

16. The federation server of claim 15, wherein:
the first server is configured to secure the message by encrypting the message with the symmetric key, and
the second server is configured to obtain the symmetric key from the encrypted token and decrypt the message using the symmetric key.

17. The federation server of claim 15, wherein:
the first server is configured to secure the message by encrypting the message with a separate encryption key and encrypting the separate encryption key with the symmetric key, and
the second server is configured to obtain the symmetric key from the encrypted token, decrypt the separate encryption key using the symmetric key, and decrypt the message using the separate encryption key.

18. The federation server of claim 15, wherein the instructions configure the federation server to:
receive a request for each domain, of a plurality of different domains identified in the message, when the message is addressed to multiple recipients at the different domains.

19. The federation server of claim 15, wherein the symmetric key includes a proof of possession key that is accessed to decrypt message content contained in the message.

20. The federation server of claim 15, wherein the first server is associated with a first organization, and the second server is associated with a second organization.

* * * * *